June 4, 1957  G. C. BENNETT  2,794,680
LAWN SPRINKLER WITH TILTABLE SUPPORT
Filed Nov. 18, 1954
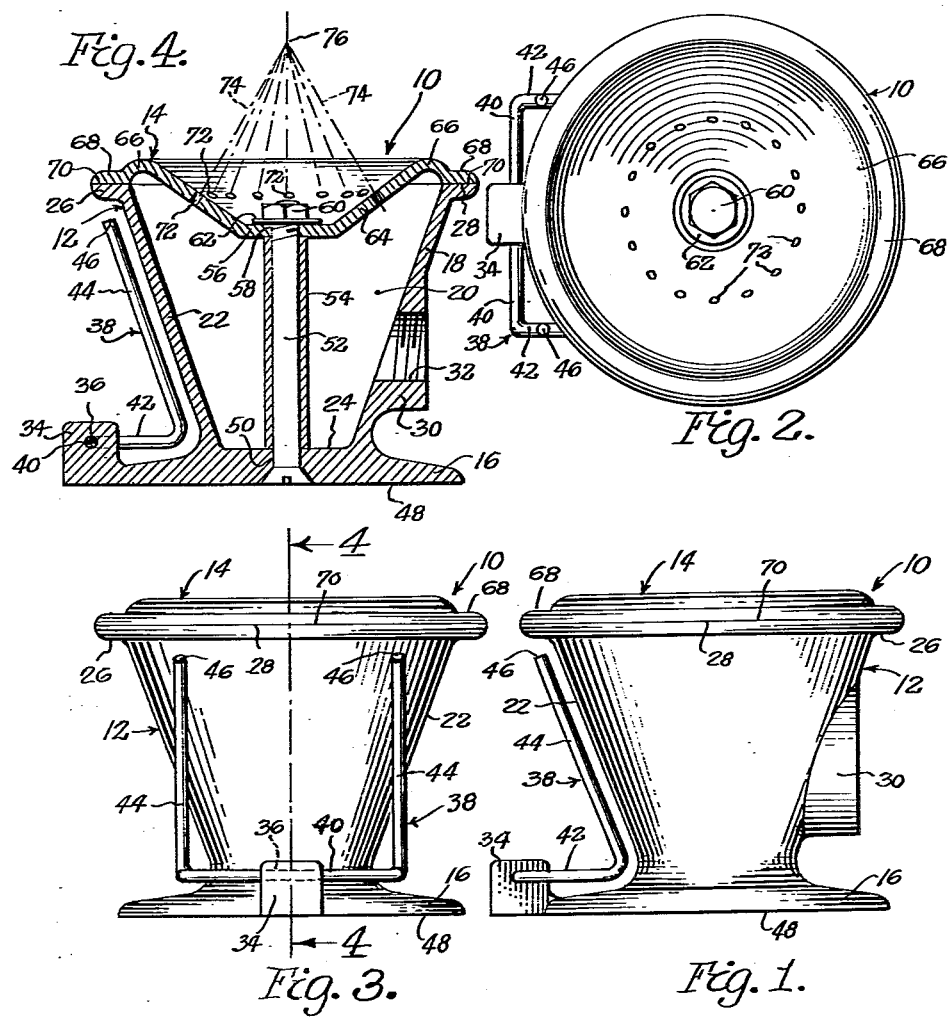
INVENTOR.
Gordon C. Bennett
BY Barthel+Bugbee
Attys

United States Patent Office 2,794,680
Patented June 4, 1957

2,794,680

LAWN SPRINKLER WITH TILTABLE SUPPORT

Gordon C. Bennett, Highland Park, Mich.

Application November 18, 1954, Serial No. 469,657

1 Claim. (Cl. 299—72)

This invention relates to sprinklers and, in particular, to lawn sprinklers or the like.

One object of this invention is to provide a lawn sprinkler which converts the flow of water from a hose into a mist by the collision of multiple converging streams of water in mid-air, these streams proceeding from the top of an approximately conical hollow base, the sloping sides of which direct the incoming water easily and efficiently toward the outlet openings in the top of the sprinkler.

Another object is to provide a lawn sprinkler as set forth in the preceding object wherein the construction is such that the sprinkler body may be cast or molded in two portions from metal, synthetic plastic or rubber, and afterward assembled in a simple manner.

Another object is to provide a lawn sprinkler as set forth in the preceding objects wherein the top containing the spray openings is itself of concave approximately conical shape so as to further enhance the flow of the water streams upward to their point of convergence.

Another object is to provide a lawn sprinkler of the foregoing character equipped with a tilting device which enables the sprinkler to be optionally mounted in a tilted position in order to confine the spray to a more limited area such as, for example, to prevent the spray from being wasted upon a sidewalk or driveway, this tilting device being quickly and easily put into or out of operation according to the desire of the user.

Other objects and advantages of the invention will become apparent during the course of the following description of the accompanying drawing, wherein:

Figure 1 is a side elevation of a lawn sprinkler, according to one form of the invention;

Figure 2 is a top plan view of the lawn sprinkler shown in Figure 1;

Figure 3 is a left-hand side elevation of the lawn sprinkler shown in Figure 1; and Figure 4 is a central vertical section taken along the line 4—4 in Figure 3.

Referring to the drawing in detail, Figures 1 to 4 inclusive show a lawn sprinkler, generally designated 10, according to one form of the invention as consisting generally of a casing unit 12 and a top unit 14 mounted thereon, the two units 12 and 14 being capable of being cast or molded individually and separately and afterward assembled and held together in the manner described below. The casing unit 12 consists of a disc-shaped base portion 16 and a hollow frusto-conical side portion 18 forming a frusto-conical chamber 20 with side walls 22 diverging upward from the bottom surface 24 to an annular flange 26 having an annular junction contact surface 28. The side wall 18 at any convenient location is provided with a boss 30 having a port or opening 32 preferably threaded, for the reception of the conventional threaded end of an ordinary garden hose (not shown).

The base portion 16 on one side, either diametrically opposite the boss 30 or at right angles thereto is provided with an upstanding lug 34 having a horizontal bore 36 therethrough for pivotally receiving a swinging support, generally designated 38. The swinging support 38 is for the purpose of supporting the sprinkler 10 in a tilted position, if desired, so as to limit the spray thereof to a restricted area such as to prevent it from reaching a sidewalk, driveway or the like. The swinging support 38 consists of a straight central portion 40 which passes through the bore 36 and has straight horizontal portions 42 at its opposite ends perpendicular to the central portion 40 and hence parallel to one another. The horizontal portions 42 at their opposite ends terminate in upwardly-inclined spaced parallel legs 44 which can be swung from their folded or inactive positions shown in the drawings to an active or tilting position (not shown) wherein the ends 46 rest upon the ground, causing the bottom surface 48 of the base portion 16 to assume a tilted position relatively to the ground.

The base portion 16 is drilled centrally with a vertical hole 50 adapted to receive a vertical bolt 52 surrounded by a tubular spacer 54 which engages the circular horizontal central portion 56 of the top unit 14. The central portion 56 is drilled as at 58 for the passage of the bolt 52, the upper end of which is threaded through a retaining nut 60 immediately above a washer 62. The washer 62 engages the central top portion 56 and presses it downward against the upper end of the spacer 54 so as to hold the top unit 14 and casing unit 12 in assembly with one another.

The top unit 14, in addition to the central horizontal circular portion 56, is provided with a concave or upwardly-diverging frusto-conical wall 64 which at its rounded annular upper edge 66 curves downward to an annular flange 68 having an annular contact surface 70 mating with the junction contact surface 28 so as to form a water-tight joint therebetween. For the sake of simplicity, the junction contact surfaces 28 and 70 have been shown as flat surfaces without a gasket whereas, if desired, the surfaces may be provided with interfitting ribs or grooves, or provided with a gasket. The conical concave portion 64 is provided with multiple nozzle openings or holes 72 arranged in a circle, the axes 74 of which converge upwardly to a common apex 76 at which the streams of water collide to form a mist or fog, as described below.

In the operation of the invention, let it be assumed that the sprinkler 10 has been connected to a garden hose by threading the end thereof into the threaded opening 32, that the opposite end of the hose has been connected to a faucet and the water turned on. The water flows from the hose into the upwardly-diverging frusto-conical chamber 20 whence it impinges against the upwardly-flaring inner surface 22 of the side wall 18, rebounding toward the conical top portion 64 where it passes through the nozzle holes 72. Since the holes 72 are of restricted diameter, the pressure of the water causes multiple streams to spurt upward out of the holes 72 along the axis lines 74, these streams colliding at the junction point 76 and causing a fine spray or fog of water which makes a very efficient lawn-watering spray.

In the event that the user desires to set up the sprinkler 10 near a sidewalk, driveway or the like, and prevent the spray from reaching it, he swings the support 38 in a counterclockwise direction (Figures 1 and 4) so as to cause the base portion 16 to be tilted upward at an angle, with the bottom surface 48 facing the sidewalk or driveway and with the legs 44 projecting downward so that the ends 46 thereof rest upon the ground. This arrangement thus causes the spray to be directed inward toward the lawn and away from the driveway or sidewalk.

The lower and upper units 12 and 14 of the sprinkler 10 are shown in the drawing, for purposes of illustration, as made from metal or synthetic resin by casting, molding, die casting or the like. It is also contemplated that the units 12 and 14 of the sprinkler 10 can be constructed out of natural or synthetic rubber, or a mixture thereof. When so manufactured from so-called elastic deformable material, the generic name thereof, the sprinkler has the additional advantage of being incapable of denting or being dented during storage or use, and also will not rust or otherwise deteriorate over a long period of time. When made of elastic material, the top unit 14 is prevented from expanding away from the casing unit 12 by reason of the bolt 52 and its associated parts. For a sprinkler 10 made from rubber or synthetic rubber, it will optionally be found convenient to insert a metal or plastic hose coupling in the port or opening 32, since stronger threads are more easily provided in those materials.

What I claim is:

A lawn sprinkler comprising a hollow frusto-conical casing having a hose coupling portion therein and containing an approximately conical water chamber, a top member super-imposed on said casing and having a multiplicity of upwardly-converging spray holes therein with their axes directed toward a common point of convergence, means for securing said top member to said casing, said bottom member having a laterally-projecting base thereon, and a tiltable support comprising a swinging member having a central portion pivotally mounted on said base at one side thereof and legs projecting outwardly from the opposite ends of said central portion, said support being movable from an inoperative position adjacent said conical casing to an operative position tiltably supporting said base.

References Cited in the file of this patent

UNITED STATES PATENTS

| | | |
|---|---|---|
| 666,580 | Van Sickle | Jan. 22, 1901 |
| 1,017,638 | McCoole | Feb. 13, 1912 |
| 1,228,186 | Darlington | May 29, 1917 |
| 1,339,579 | Runyan | May 11, 1920 |
| 1,549,204 | Merigold | Aug. 11, 1925 |
| 1,650,460 | Morgan | Nov. 22, 1927 |
| 1,721,945 | Cornelius | July 23, 1929 |
| 2,532,711 | Goddard | Dec. 5, 1950 |
| 2,616,437 | Secor | Nov. 4, 1952 |